(12) United States Patent
Krogstad

(10) Patent No.: US 6,223,585 B1
(45) Date of Patent: May 1, 2001

(54) METHOD OF ACCURATELY MEASURING CONTROL FILM DENSITY REGIONS

(75) Inventor: Robert T. Krogstad, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/217,753

(22) Filed: Dec. 21, 1998

Related U.S. Application Data
(60) Provisional application No. 60/109,788, filed on Nov. 25, 1998.

(51) Int. Cl.[7] .............................. G01N 9/00; G03G 15/00
(52) U.S. Cl. .............................. 73/32 R; 399/74
(58) Field of Search .................. 399/27, 44, 53, 399/74; 73/32 R

(56) References Cited

U.S. PATENT DOCUMENTS 5,862,433 * 1/1999 Regelsberger et al. ................ 399/44

* cited by examiner

Primary Examiner—William Oen
(74) Attorney, Agent, or Firm—William F. Noval

(57) ABSTRACT

A method of accurately measuring control film density regions comprising: exposing a photosensitive film to a modulated laser beam at three known laser beam intensities representing maximum, midrange and minimum intensities to form corresponding separate sequential density regions in said film having maximum density $D_{max}$, midrange $D_{min}$ and minimum density $D_{min}$, using a densitometer, taking a first set of density readings of said maximum density region of said film, taking a second set of density readings of said midrange density region of said film, and taking a third set of readings of said minimum density region of said film; wherein said density readings are sequentially taken as said film is moved past said densitometer; and as a first try, determining $D_{max}$ as the average of a subset of said first set of density readings which are taken in the control portion of said maximum density region; determining $D_{min}$ as a preselected value; and determining $D_{mid}=D_{min}+a(D_{max}-D_{min})$ where a is a fraction.

2 Claims, 2 Drawing Sheets

METHOD OF ACCURATELY MEASURING CONTROL FILM DENSITY REGIONS

CROSS REFERENCE TO RELATED APPLICATION

Reference is made to and priority claimed from U.S. Provisional Application Ser. No. 60/109,788, filed 25 Nov. 1998, entitled CONTROL OF LASER IMAGING SYSTEM.

FIELD OF THE INVENTION

This invention relates in general to a laser imaging system and relates more particularly to the control of a laser imaging system using density patches on calibration films at the top of all other films.

BACKGROUND OF THE INVENTION

Medical laser printers have achieved wide acceptance in producing hard copy (film) of electronic (digital) images acquired from film digitizers, diagnostic imaging modalities (CT, MRI, PET, US), computed and direct digital radiography. Until recently, medical laser printers have produced medical image films which were processed using wet processing techniques. Medical laser printers have been introduced which produce medical image films which are dry processed through the use of heat. Control of the laser printer is aided by printing density patches on calibration and standard films. A densitometer reads the density patches to produce a control signal.

A problem arises in the accuracy of the densities read from the density patches by the densitometer.

SUMMARY OF THE INVENTION

According to the present invention, there is provided a solution to the problems of the prior art.

According to a feature of the present invention, there is provided a method of determining the densities of film density patches comprising the steps of: providing a film having first, second and third density patches, respectively, having densities $D_{max}$ (maximum density), $D_{min}$ (mid density) and $D_{min}$ (minimum density); taking several density readings of each of the patches; and, either, estimating $D_{max}$ as the average of several measurements in the central portion of the first density patch, discarding at least one of the largest and smallest readings, estimating $D_{min}$ as a preselected value, or, searching the entire set of readings for the highest and lowest readings and using the highest reading as the estimated $D_{max}$ and the lowest reading as the estimated $D_{min}$; and calculating $D_{mid}$ from the equation $D_{mid} = D_{min} + a(D_{max} - D_{min})$, where a is a constant with a value of less than one.

ADVANTAGEOUS EFFECT OF THE INVENTION

The present invention provides a method for accurately reading film density patches of medical image films produced by a medical laser printer.

DETAILED DESCRIPTION OF THE INVENTION

Figure 1:
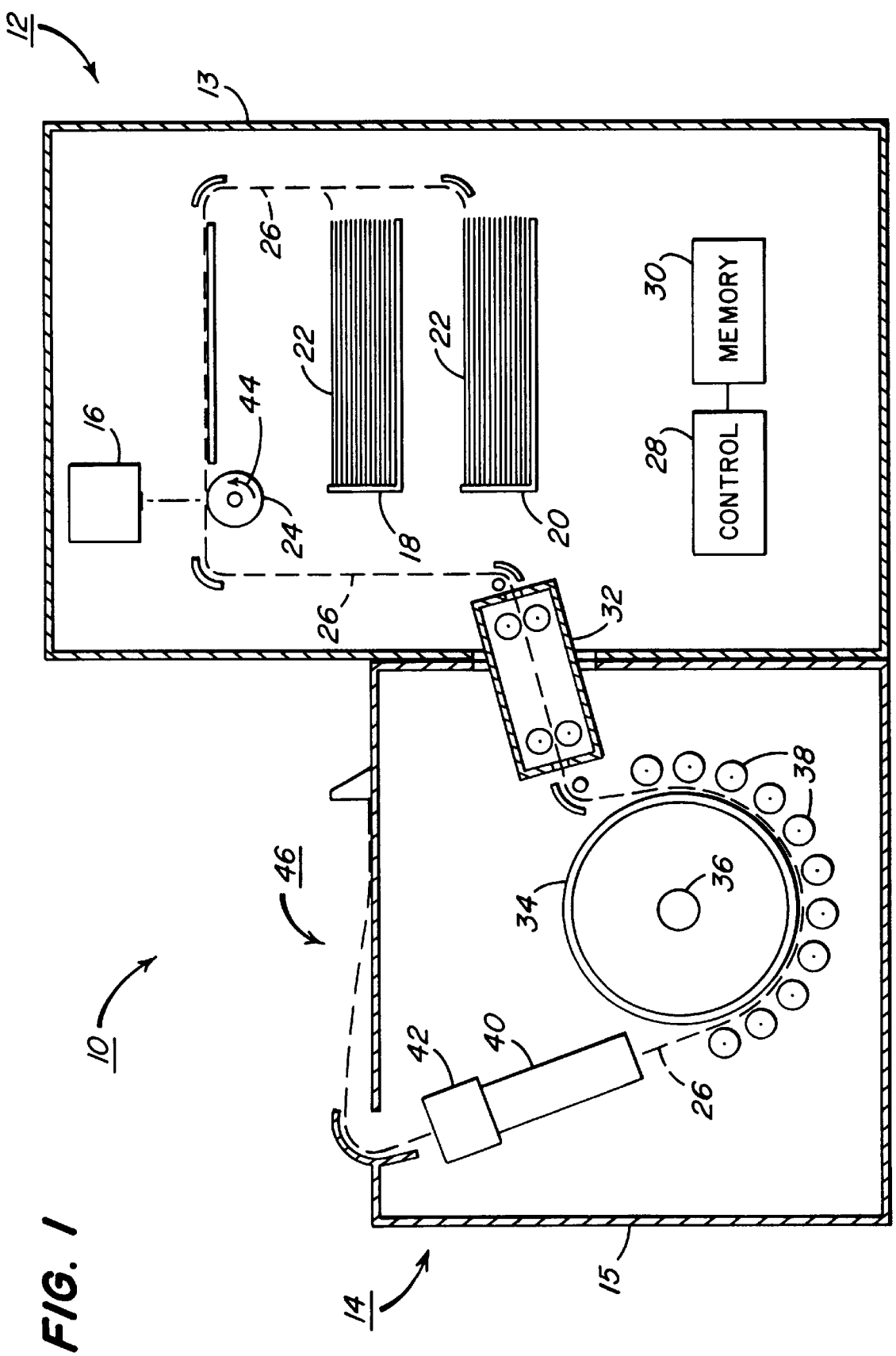
FIG. 1 is a diagrammatic view of a medical laser printer which uses the present invention.

Referring now to FIG. 1, there is shown laser imaging apparatus incorporating the present invention. As shown, apparatus 10 includes a laser printer 12 and processor 14. Although printer 12 and processor 14 are shown as housed in separate units, it will be understood that they could be integrated into one housing. In the specific application described here, printer 12 is a medical image laser printer for printing medical images on photothermographic film which is thermally processed by thermal processor 14. The medical images printed by printer 12 can be derived from medical image sources, such as medical image diagnostic scanners (MRI, CT, US, PET), direct digital radiography, computed radiography, digitized medical image media (film, paper), and archived medical images.

Printer 12 includes printer housing 13, laser scanner 16, supplies 18,20 for unexposed photothermographic film 22, a slow scan drum 24, film path 26, control 28, memory 30, printer/processor film interface 32. Processor 14 includes processor housing 15, interface 32, drum 34 heated by lamp 36, hold-down rollers 38 located around a segment of the periphery of drum 34, exposed film cooling assembly 40, densitometer 42, and output tray 44.

Apparatus 10 operates in general as follows. A medical image stored in memory 30 modulates the laser beam produced by the laser of scanner 16. The modulated laser beam is repetitively scanned in a fast or line scan direction to expose photothermographic film 22. Film 22 is moved in a slow or page scan direction by slow scan drum 24 which rotates in the direction of arrow 44. Unexposed photothermographic film 22, located in supplies 18,20, is moved along film path 26 to slow scan drum 24. A medical image is raster scanned onto film 22 through the cooperative operation of scanner 16 and drum 24. Density patches are scanned at the top of film 22.

After film 22 has been exposed, it is transported along path 26 to processor 14 by printer/processor film interface 32. The exposed film 22 is developed by passing it over heated drum 34 to which it is held by rollers 38. After development, the film 22 is cooled in film cooling assembly 40. Densitometer 42 reads the density of control patches at the front edge of film 22 to maintain calibration of the laser imaging apparatus 10. The cooled film 22 is output to tray 46 where it can be removed by a user. Densitometer 42 has two detectors, one is used as a trigger and the other to measure density.

Figure 2:
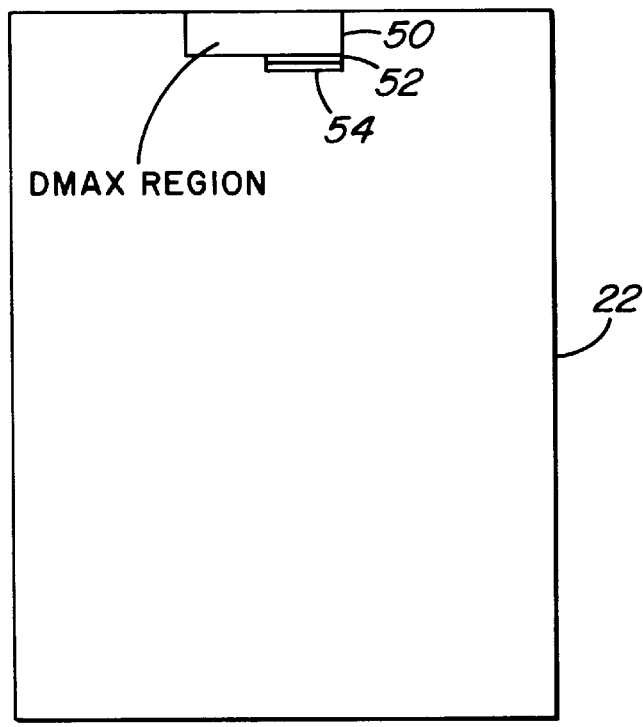
FIG. 2 is a plan view of a film with density patches.
Figure 3:
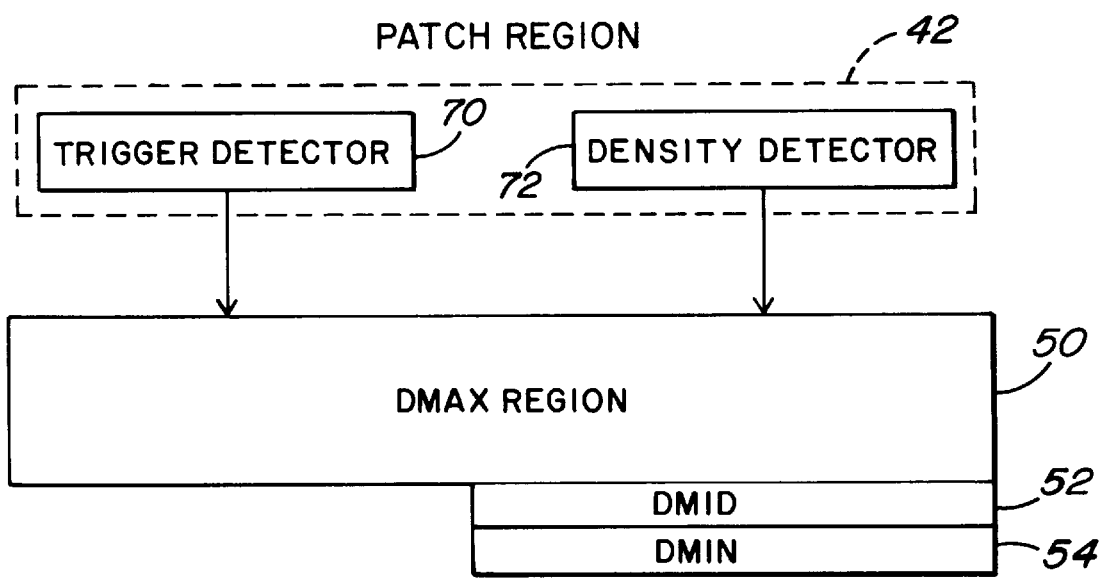
FIG. 3 is a more detailed view of the density patch region of the film shown in FIG. 2.

FIG. 2 shows film 22 shows film 22 with $D_{max}$ density patch (region) 50, $D_{mid}$ density patch 52, and $D_{min}$ density patch 54. FIG. 3 shows the density patches in greater detail including the trigger detector 70 and density detector 72 of densitometer 42. The $d_{max}$ region 50 provides the trigger.

The density patches have the following dimensions.

| | | |
|---|---|---|
| Top of film to $d_{mid}$ patch | $x_1$ pixels | $\sim l_1$ cm |
| Width of dmax patch | $x_2$ pixels | $\sim l_2$ cm |
| Width of $d_{mid}$ and $d_{min}$ patches | $x_3$ pixels | $\sim l_3$ cm |
| $D_{mid}$ and $d_{min}$ patch height | $x_4$ pixels | $\sim l_4$ cm |

$D_{max}$ is printed with codevalue $CV_{max}$.
$D_{mid}$ is printed with codevalue $CV_{mid}$.
$D_{min}$ is printed with codevalue $CV_{min}$.
$D_{mid}$ is $D_{min}$ plus a of the difference between $D_{min}$ and $D_{max}$, where a is a fraction
Calculate $D_{mid}$ from $D_{min}$ and $D_{max}$ $D_{mid} = D_{min} + (a)*(D_{max} - D_{min})$ Readings Per Region This is a description of the data stream in terms of the number of readings returned from the densitometer in the $D_{max}$, $D_{mid}$, and $D_{min}$, regions. The numbers are not intended to be precise. They are to indicate the approximate number of readings per region.

Parameters:
Drum diameter
Drum circumference
Contact distance (~50%)
Densitometer readings
Densitometer aperture
Formulas:

| | |
|---|---|
| Transport (cm / sec) | = (contact distance) / (process time) |
| Readings / cm | = (readings / second) / (cm / second) |
| Readings / region | = (readings / cm) * (region size) |
| Readings not bridging | = total readings * (patch height - aperture) / patch height |

The method of the invention extracts the plateau values from a stream of data. The objective is to find a plateau in the data and discard anomalous data. The data is sorted to remove anomalous values. The process for $D_{mid}$ is different from that for $D_{min}$ because the trend of data after $D_{mid}$ is decreasing values, but not after $D_{min}$.

The following parameters are determined through experience.

1. The initial estimate of $D_{min}$.
2. The minimum number of readings in $D_{mid}$ and $D_{min}$ regions.
3. The fraction of $D_{mid}$ and $D_{min}$ readings in the plateau regions.
4. The maximum fraction of the $D_{mid}$ and $D_{min}$ range in the plateau.

Acquire Data

When the edge of the film triggers data acquisition, record y readings and then stop. No analysis is done during data acquisition so there cannot be any problem with competition for CPU time with other processes. The buffer size is set to a single size for simplicity. (It could be customized to the transport speed.)

Estimate $D_{max}$, $D_{mid}$, and $D_{min}$

Two methods are used to estimate $D_{max}$ and $D_{min}$. The calculation for estimating $D_{mid}$ does not change. Each set of readings is analyzed with the first method. If that fails, the second method is tried. If the second method fails, the analysis fails.

First Try $D_{max}$ and $D_{min}$

Use the process time to select several measurements centered ~½ way through the $D_{max}$ region. Discard a few largest and a few smallest. The average of the middle measurements is the $D_{max}$ estimate. The estimate is made for $D_{min}$.

Second Try $D_{max}$ and $D_{min}$

Search the entire set of readings for the highest and lowest. Use the highest as the estimated $D_{max}$ and the lowest as the estimated $D_{min}$.

Estimate $D_{mid}$

Calculate $D_{mid}$ using the equation $(D_{mid}=D_{min}+a*(D_{max}-D_{min}))$

Partition

Divide the data set into 4 regions.
   a. $D_{max}$ region
   b. $D_{mid}$ region
   c. $D_{min}$ region
   d. Image region (after calibration patches)

1. Calculate reading value for halfway between $D_{max}$ and $D_{mid}$ (threshold 0).
2. Calculate reading value for halfway between $D_{mid}$ and $D_{min}$ (threshold 1).
3. Search densitometer readings array, starting after the readings used to calculate $D_{max}$, to find first reading less than threshold 0.
4. Search densitometer readings array, starting after threshold 0, to find first reading less than threshold 1.
5. $D_{max}$ region is from first reading to threshold 0.
6. $D_{mid}$ region is from threshold 0 to threshold 1.
7. Make $D_{min}$ region same size as $D_{mid}$ region, starting at threshold 1.
8. Everything after $D_{min}$ region is image region.

Check Partition

Partition is successful if:
   a. Find threshold 0 and threshold 1.
   b. Data includes enough readings to make $D_{min}$ region the same size as $d_{mid}$ region.
   c. At least several readings in $D_{mid}$ region. ($D_{min}$ region is the same size, so no need to check both.)

If the partition process fails, do Estimate $D_{max}$, $D_{mid}$, and $D_{min}$ using second try method and proceed from there.

Find $D_{mid}$

Find the plateau in readings between threshold 0 and threshold 1.

1. Sort all the $D_{mid}$ region readings.
2. Find the set of readings with the smallest range which includes ¼ of the readings.
3. If more than one set of readings has the same range, use the average of all sets with the same range.
4. The average of that set is $D_{mid}$ Find $D_{min}$ Sorting does not put the desired data in the middle. Anomalous low values need to be discarded (step 4).

1. Sort all the $D_{min}$ region readings.
2. Find the set of readings which is the lowest ¼ of the readings.
3. Find the range of the lowest ¼ of the readings.
4. Try to make the set more compact. Compare the difference between the lowest two readings in the set with the difference between the highest reading in the set and the next higher reading outside the set. As long as the difference between the two lowest readings in the set is more than twice the difference between the highest reading in the set and the next higher reading outside the set, add the higher reading and remove the lowest.
5. The average of that set is $D_{min}$.

Check Plateau

Check that the set of readings which is the plateau is concentrated in a small fraction of the total range of readings for both $D_{mid}$ and $D_{min}$ regions.

1. Calculate the ratio between the range of all readings in the region and the range of readings in the plateau region. If that ratio is less than 16:1, the readings are spread over too much of the total range to be considered a plateau.
2. If $D_{mid}$ had multiple regions with the same range and those regions have no readings in common or the averages differ by more than ¹⁄₁₆ of the total $D_{mid}$ range, there are multiple plateaus.
3. If the result is an unsatisfactory plateau for $D_{mid}$ or $D_{min}$ (either too spread out or multiple plateaus) and the analysis was done with the Second Try $D_{max}$ and $D_{min}$ method, the analysis has failed. If it was done with the First Try $D_{max}$ and $D_{min}$ use the Second Try $D_{max}$ and $D_{min}$ method, and then complete the analysis.

DATA CONVERSION

Conversion from a reading (R) sent by the densitometer to a density value (D) is by the following formula:

$$D=(((R*2)-\text{offset})/\text{calibration\_factor})/100$$

Conversion from density (D) to a reading (R) as sent by the densitometer is by the following formula:

$$R=((100*D*\text{calibration\_factor})+\text{offset})/2$$

Density cannot be negative. If the calculation for density gives a number less than 0, the density is set to 0.

The calibration factor and offset are sent by the densitometer.

No other processing is done during data acquisition. After acquisition is complete, calculate the densitometer reading for the anticipated $D_{min}$ (0.30 for the First Try). Do all the calculations to partition the data and find $D_{mid}$ and $D_{min}$ using data in densitometer units as received from the densitometer. After calculating $D_{mid}$ and $D_{min}$ in these units, convert $D_{mid}$ and $D_{min}$ to density multiplied by 1000, using the following formula:

$$D*1000=(((R*2)-\text{offset}/\text{calibration\_factor})*10$$

This integer value, with a range of 0–4000 for densities 0.0 to 4.0, is the number returned to the printer.

EXAMPLE BASED ON FICTIONAL DATA

This example follows the template of the Logic section which precedes it. The number of data elements is reduced to make it manageable. Processing time is assumed to be 1.44 seconds. Different data sets are used for different parts of the example. The real data is 16 bit integers. Data here is integer values which represent density multiplied by 1000 (2000 is density 2.000).

Acquire Data

Use this data set. There are 64 elements, not 512.

| | | | | | | | | | | |
|---|---|---|---|---|---|---|---|---|---|---|
| 0–9   | 1700 | 2900 | 3500 | 3500 | 3500 | 3500 | 3500 | 3500 | 3500 | 3507 |
| 10–19 | 3503 | 3504 | 3506 | 3508 | 3502 | 3509 | 3501 | 3500 | 3500 | 3500 |
| 20–29 | 3500 | 3500 | 3500 | 3000 | 2500 | 2000 | 1505 | 1508 | 1501 | 1502 |
| 30–39 | 1504 | 1503 | 1507 | 1501 | 1509 | 1503 | 1504 | 1506 | 1502 | 1200 |
| 40–49 | 900  | 600  | 304  | 309  | 302  | 303  | 305  | 307  | 301  | 303  |
| 50–59 | 308  | 302  | 301  | 307  | 303  | 800  | 1300 | 1800 | 2300 | 2300 |
| 60–63 | 2300 | 2300 | 2300 | 2300 | | | | | | |

Estimate $D_{max}$, $D_{mid}$, and $D_{min}$

Both methods are shown.

First Try $D_{max}$ and $D_{min}$

Processing time of 1.44 seconds would produce 24 pixels in the $D_{max}$ region. The center is the 12$^{th}$ reading.

The center 8 are values 7 through 14: 3507, 3503, 3504, 3506, 3508, 3502, 3509, 3501

Sorted, the data is: 3501, 3502, 3503, 3504, 3506, 3507, 3508, 3509

Discarding the top and bottom 2 leaves: 3503, 3504, 3506, 3507

The average is: 3505

Density 0.30 is equivalent to densitometer reading 300.

Second Try $D_{max}$ and $D_{min}$

The highest and lowest of the entire set of readings are 3508 and 301.

Estimate $D_{mid}$

Calculate $D_{mid}$ using the equation in Patch Description.

$$(D_{mid}=D_{min}+\tfrac{3}{8}*(D_{max}-D_{min}))$$

Based on first try:

$$D_{max}=3505 \; D_{min}=300 \; D_{mid}=300+(\tfrac{3}{8}*3205)=300+1202=1502$$

Based on second try:

$$D_{max}=3508 \; D_{min}=301 \; D_{mid}=301+(\tfrac{3}{8}*3207)=300+1203=1503$$

This example never requires the second try. The process is shown just to show how it works.

Partition

Divide the data set into 4 regions.
a. $D_{max}$
b. $D_{mid}$
c. $D_{min}$
d. After the patches 1. threshold 0=$(D_{max}+D_{mid})/2$=(3505 +1502)/2=2504
2. threshold 1=$(D_{mid}+D_{min})/2$=(1502 +300)/2=901
3. First reading < threshold 0 (2004) is reading 25 (2000)
4. First reading < threshold 1 (901) is reading 40 (900)
5. $D_{max}$ region: densitometer readings 0 through 23.
6. $D_{mid}$ region: densitometer readings 24 through 39.
7. $D_{min}$ region: densitometer readings 40 through 55.
8. After the patches: densitometer readings 55 through end.

Check Partition

Partition is successful:
a. Found threshold 0 and threshold 1.
b. Data includes 8 readings after $D_{min}$ region
c. $D_{mid}$ region has 16 readings.

Find $D_{mid}$

Find the plateau in the $D_{mid}$ region.

1. Sort all the $D_{mid}$ region readings (16 readings).

| | | | | | | | | | | | |
|---|---|---|---|---|---|---|---|---|---|---|---|
| raw    | 2500 | 2000 | 1505 | 1508 | 1501 | 1502 | 1504 | 1503 | 1507 | 1501 | 1509 |
|        | 1503 | 1504 | 1506 | 1502 | 1200 | | | | | | |
| sorted | 2500 | 2000 | 1509 | 1508 | 1507 | 1506 | 1505 | 1504 | 1504 | 1503 | 1503 |
|        | 1502 | 1502 | 1501 | 1501 | 1200 | | | | | | |

2. Find the set of readings with the smallest range which includes ¼ of the readings (4 readings).

| sorted | 2500 | 2000 | 1509 | 1508 | 1507 | 1506 | 1505 | 1504 | 1504 | 1503 |
|---|---|---|---|---|---|---|---|---|---|---|
|  | 1503 | 1502 | 1502 | 1501 | 1501 | 1200 |  |  |  |  |
| range | 992 | 493 | 3 | 3 | 3 | 2 | 2  1 | 1 | 2 | 1  2 |
| average |  |  |  |  |  | 1504 |  1503 |  | 1502 |  |

3. Three sets have a range of 1.
4. The average of the three sets with range=1 is 1503, the $D_{mid}$ densitometer reading.

Find $D_{min}$

Find the plateau in the $D_{min}$ region.
1. Sort all the $D_{min}$ region readings (16 readings).

| raw | 900 | 600 | 304 | 309 | 302 | 303 | 305 | 307 | 301 | 303 |
|---|---|---|---|---|---|---|---|---|---|---|
|  | 308 | 302 | 301 | 307 | 303 | 800 |  |  |  |  |
| sorted | 900 | 600 | 800 | 309 | 308 | 307 | 307 | 305 | 304 | 303 |
|  | 303 | 303 | 302 | 302 | 301 | 301 |  |  |  |  |

2. Find the set of readings which is the lowest ¼ of the readings (4 readings).

| raw | 900 | 600 | 304 | 309 | 302 | 303 | 305 | 307 | 301 | 303 | 308 |
|---|---|---|---|---|---|---|---|---|---|---|---|
|  | 302 | 301 | 307 | 303 | 800 |  |  |  |  |  |  |
| sorted | 900 | 600 | 800 | 309 | 308 | 307 | 307 | 305 | 304 | 303 | 303 |
|  | 303 | 302 | 302 | 301 | 301 |  |  |  |  |  |  |
| lowest ¼ |  | 302 | 302 | 301 | 301 |  |  |  |  |  |  |

3. Find the range of the lowest ¼ of the readings. range 1
4. Try to make the set more compact. No change is required, but consider this $D_{min}$ data set:

| sorted | 310 | 309 | 308 | 307 | 305 | 303 | 300 |
|---|---|---|---|---|---|---|---|
| the lowest 4 readings |  |  |  | 307 | 305 | 303 | 300 |

The difference between the lowest two readings in the set is 303−300=3. The difference between the highest reading in the set and the next higher reading outside the set is 308−307=1. 3 is more than twice 1 so the set which defines the plateau drops the lowest reading and includes the next higher reading. Now the difference between the lowest two readings in the set is 305−303=2, and the difference between the highest reading in the set and the next higher reading outside the set is 309−308=1. 2 is not twice as much as 1 so no further change is made. The set of reading that define $D_{min}$ would then be 308, 307, 305, and 303. The average of the four readings is 302.

Check Plateau

Check that the set of readings which is the plateau is concentrated in a small fraction of the total range of readings for both dmid and dmin regions.
1. $D_{mid}$ total range 2504−1202=1302. $D_{mid}$ plateau range 1 is less than 1302/16=81.

$D_{min}$ total range 901−300=601. $D_{mid}$ plateau range 1 is less than 600/16=38.

2. $D_{mid}$ had three plateau regions. They meet both requirements for being considered a single plateau. They have common readings. Total range of $D_{mid}$ averages is 1504−1502=2. That range is less than 1302/16=81.

3. All plateau checks are satisfactory. Do not try second method.

The invention has been described in detail with particular reference to certain preferred embodiments thereof, but it will be understood that variations and modifications can be effected within the spirit and scope of the invention.

PARTS LIST 10 apparatus
12 laser printer
13 printer housing
14 processor
16 laser scanner
18,20 supplies
22 unexposed photothermographic film
24 slow scan drum
26 film path
28 control
30 memory
32 interface
34 drum
36 lamp
38 hold-down rollers
40 film cooling assembly
42 densitometer
44 output tray
46 tray
50 $D_{max}$ density patch
52 $D_{mid}$ density patch
54 $D_{min}$ density patch
70 trigger detector
72 density detector

What is claimed is:

1. A method of accurately measuring control film density regions comprising:

exposing a photosensitive film to a modulated laser beam at three known laser beam intensities representing maximum, midrange and minimum intensities to form corresponding separate sequential density regions in said film having maximum density $D_{max}$, midrange $D_{min}$ and minimum density $D_{min}$;

using a densitometer, taking a first set of density readings of said maximum density region of said film, taking a second set of density readings of said midrange density region of said film, and taking a third set of readings of said minimum density region of said film; wherein said density readings are sequentially taken as said film is moved past said densitometer; and as a first try, determining $D_{max}$ as the average of a subset of said first set of density readings which are taken in the central portion of said maximum density region; determining $D_{min}$ as a preselected value; and determining $D_{mid}=D_{min}+a(D_{max}-D_{min})$ where a is a fraction.

2. The method of claim 1 wherein said method includes as a second try if said first try is unsuccessful, determining said $D_{max}$ and said $D_{min}$ by using the highest reading from said first and second, and third sets of readings as $D_{max}$ and using the lowest reading from said first, second and third readings as $D_{min}$, determining $D_{mid}$ from the equation $D_{mid}=D_{min}+a(D_{max}-D_{min})$ where a is a fraction.

* * * * *